No. 896,395. PATENTED AUG. 18, 1908.
W. KOSICKY, DEC'D.
E. KOSICKY, ADMINISTRATRIX.
ROTARY OVEN.
APPLICATION FILED FEB. 13, 1907.

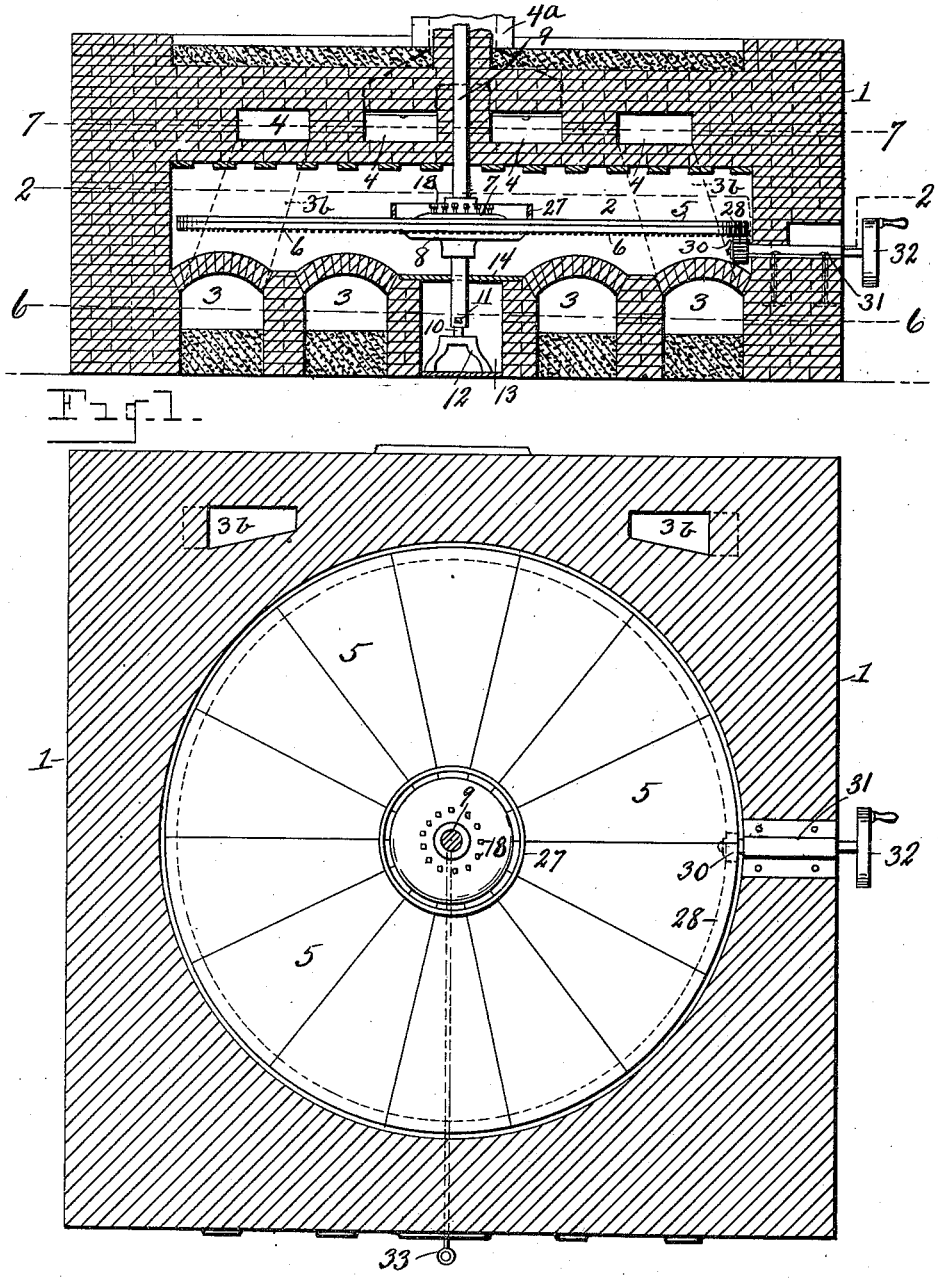

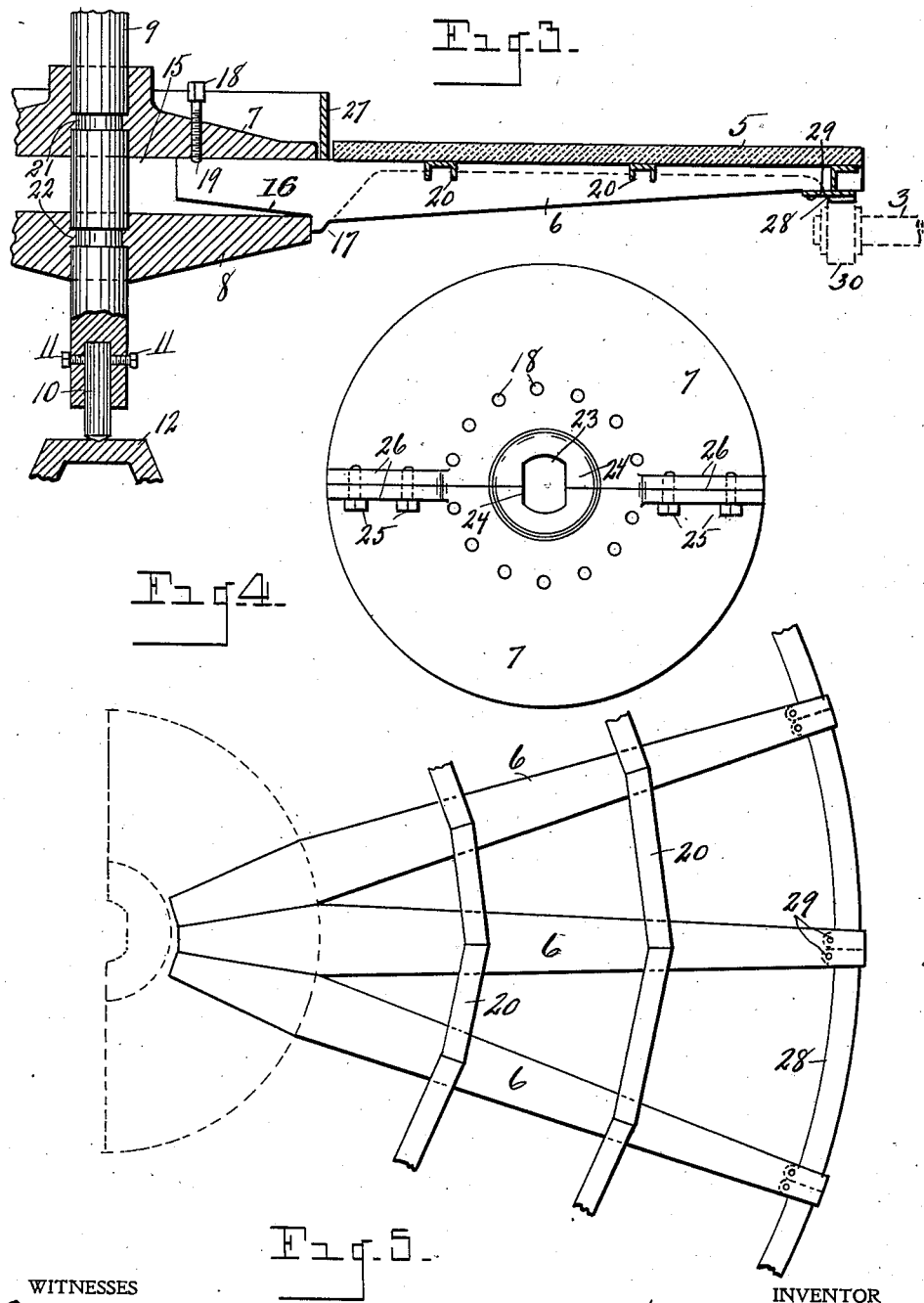

3 SHEETS—SHEET 3.

UNITED STATES PATENT OFFICE.

ELIZABETH KOSICKY, OF DETROIT, MICHIGAN, ADMINISTRATRIX OF WILLIAM KOSICKY, DECEASED, ASSIGNOR TO JOHN A. RICHARD, OF DETROIT, MICHIGAN.

ROTARY OVEN.

No. 896,395.           Specification of Letters Patent.           Patented Aug. 18, 1908.

Application filed February 13, 1907. Serial No. 357,191.

*To all whom it may concern:*

Be it known that I, ELIZABETH KOSICKY, a citizen of the United States, residing at Detroit, in the county of Wayne and State of Michigan, administratrix of the estate of WILLIAM KOSICKY, late a citizen of the United States, deceased, declare that said WILLIAM KOSICKY, deceased, did invent certain new and useful Improvements in Rotary Ovens, of which the following is a specification.

This invention relates to rotary ovens, and consists in the construction and arrangement of parts hereinafter fully set forth and pointed out particularly in the claims.

The object of the invention is to provide an oven of the character described, of simple and inexpensive construction, wherein the arrangement is such as to effect economy in the use of fuel, maintain a uniform even heat and insure an easy rotation of the oven bed.

The above object is attained by the structure illustrated in the accompanying drawing, in which:—

Figure 7:
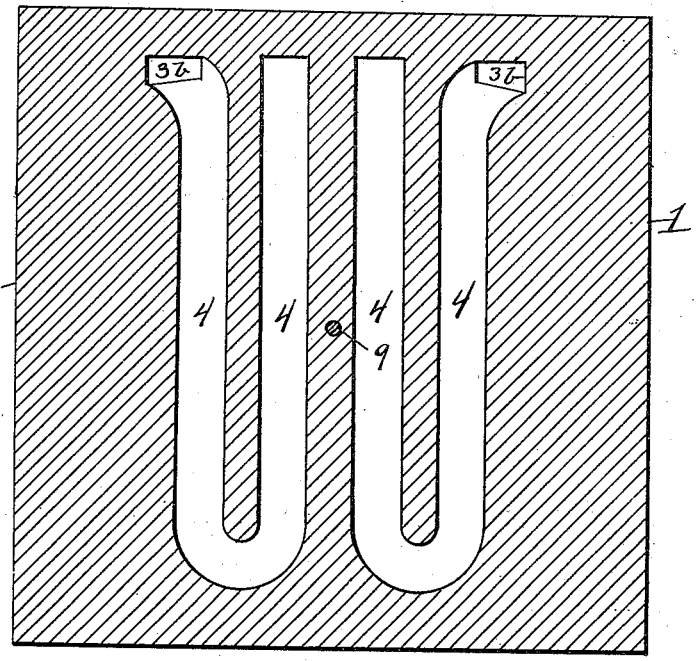
Figure 6:
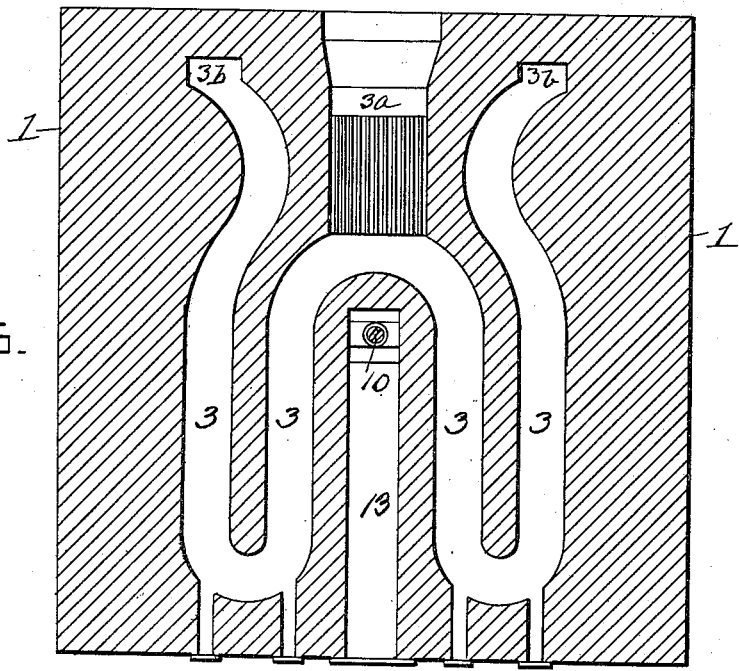

Figure 1 is a transverse section through an oven involving this invention. Fig. 2 is a horizontal section through the baking chamber as on line 2—2 of Fig. 1. Fig. 3 is an enlarged fragmentary detail in section, showing the manner of securing the radial arms supporting the bed of the oven in the hub on the vertical rotary shaft. Fig. 4 is a plan view of the hub and shaft. Fig. 5 is a fragmentary view in plan of three of the radial arms which carry the soap stones of which the bed of the oven is formed. Fig. 6 is a horizontal section through the lower flues, as on line 6—6 of Fig. 1. Fig. 7 is a like section through the upper return flues, as on line 7—7 of Fig. 1.

Referring to the characters of reference, 1 designates the brick work of the oven which surrounds and incloses the circular baking chamber 2. Below the baking chamber are the lower return flues 3 which lead from the furnace 3$^a$ and communicate, through the vertical flues 3$^b$, with the upper return flues 4 above the baking chamber, which lead to the stack 4$^a$, as shown by dotted lines in Fig. 1.

It will be seen on referring to Fig. 1 that the arches of the lower flues are close to the under side of the rotary oven bed which is located in the baking chamber, thereby presenting the heat more directly to the under side of the oven bed and obviating the necessity of heating an extensive space of dead air between the arches of the lower flues and the bottom of the oven, as is common in most rotary ovens, effecting material economy in heat.

The bed of the oven comprises soap stone segments 5 which are mounted upon radial arms 6, set between the upper and lower hub pieces 7 and 8 which are mounted upon and made fast to the vertical shaft 9. This shaft 9 is supported at its upper end in the brick work of the oven, and its lower end is provided with a steel bearing pin 10 secured by set screws 11 in a socket in the end of said shaft, said pin entering a conical recess in the case hardened bearing plate 12 which is supported in the central space 13 between the lower flues 3, the shaft 9 passing through a covering plate 14 which keeps the heat from said bearing. This arrangement enables the bearing pin when worn out, to be removed and a new pin substituted.

The arms 6 enter the space 15 between the hub pieces, their inner ends being tapered, as at 16, and there being upon their lower edge a shoulder 17 which engages the edge of the lower hub to regulate the distance which said arms may enter between the hub members. Passing through and threaded in the upper hub member are the set screws 18. There is one of these set screws for each of the arms 6, adapted to enter a recess 19 in the upper edge thereof near its inner end. By means of said set screws, the arms may be adjusted so as to bring the outer ends into the same horizontal plane, and thereby more perfectly support the soap-stone segments 5 which constitute the floor or bed of the oven. To brace the arms laterally, they are connected by the transverse channel bars 20.

The upper and lower hub members 7 and 8 are made in two parts to facilitate their attachment to the shaft 9 and for the purpose of spacing the hub members the proper distance apart to receive the inner ends of the arms 6, the shaft is provided with an upper peripheral groove 21 and a lower peripheral groove 22. The wall of the central opening 23 through each of the two-part hub members which embraces the vertical shaft, is provided with the segmental ribs or flanges 24 adapted to enter the preipheral groove in the shaft to support the hub members in the proper vertical position, the parts of the hub members being confined in place by the binding bolts 25 which pass transversely through the projecting ears 26 on said parts.

Surrounding the upper hub members 7 is an annular flange 27 which prevents the goods being baked from getting off the soapstone onto the iron hub.

In order to rotate the iron bed easily and at a slow uniform speed, there is employed a circular rack 28 made up of segments secured to the under side of the outer ends of the arms 6, by means of bolts 29 passing through the projecting ears on said segments, as shown by dotted lines in Fig. 5. Meshing with said rack is a pinion 30 mounted upon the inner end of a shaft 31 journaled in the wall of the oven and carrying upon its outer end a belt pulley 32. By rotating the shaft 31, the oven bed will be caused to revolve slowly, thereby causing the material being baked to travel in a circle within the baking chamber, so that, should the heat be more intense in one spot than another, the material is not excessively baked at that point.

To provide for oiling the bearing at the lower end of the shaft 9, an oil tube 33 (see Fig. 2) is passed through the wall of the oven and directed to said bearing through which it may be lubricated.

Having thus fully set forth this invention, what is claimed is:—

1. A rotary oven, comprising a shallow baking chamber, upper and lower fire flues on opposite sides of said chamber, a central vertical shaft, upper and lower hub members mounted on said shaft, a plurality of radial arms extending in a horizontal plane and supported wholly at their inner ends between the hub members on said shaft, an oven bed carried by said arms, means for adjusting said arms vertically to level the oven bed, a circular rack connecting the outer ends of said arms and a rotary shaft having a pinion engaging said rack.

2. A rotary oven, comprising a baking chamber, a shaft passing vertically through said chamber, upper and lower hub members mounted on the shaft, radial arms supporting the bed of the oven, said arms having their inner ends confined between the hub members and supported wholly thereby, and means carried by one of the hub members engaging the inner ends of said arms to tilt them on the lower hub member and effect a vertical adjustment of their outer ends.

3. A rotary oven, comprising a baking chamber, a vertical shaft passing therethrough, upper and lower hub members each formed in two parts, and each adapted to be clamped to said shaft, radial arms carrying the oven bed, the inner ends of said arms being confined between said hub members and supported wholly thereby, means carried by the hub members for adjusting the inner ends of the arms vertically, and a rack and pinion for rotating the oven bed.

In testimony whereof I sign this specification in the presence of two witnesses.

ELIZABETH KOSICKY,
*Administratrix of the estate of William Kosicky, deceased.*

Witnesses:
JOHN A. RICHARD,
O. B. BAENZIGER.